US005477442A

United States Patent [19]

Self

[11] Patent Number: 5,477,442

[45] Date of Patent: Dec. 19, 1995

[54] LIGHT FIXTURE FOR USE IN HAZARDOUS ENVIRONMENTS HAVING ADAPTER RING FOR ALTERNATIVE BALLAST HOUSING

[75] Inventor: Margaret A. Self, Lake Cormorant, Miss.

[73] Assignee: Thomas & Betts Corporation, Memphis, Tenn.

[21] Appl. No.: 986,170

[22] Filed: Dec. 4, 1992

[51] Int. Cl.[6] .............. B60Q 1/00

[52] U.S. Cl. .............. 362/368; 362/221

[58] Field of Search .............. 362/221, 265, 362/368

[56] References Cited

U.S. PATENT DOCUMENTS

| | | | |
|---|---|---|---|
| 4,222,093 | 9/1980 | Garcia et al. | 362/368 |
| 4,379,321 | 4/1983 | Plemmons et al. | 362/368 |
| 4,449,168 | 5/1984 | Ewing | 362/368 |
| 4,507,719 | 3/1985 | Quiogue | 362/368 |
| 5,025,356 | 6/1991 | Gawad | 362/221 |

FOREIGN PATENT DOCUMENTS

| | | | |
|---|---|---|---|
| 2336261 | 2/1975 | Germany | 362/368 |

OTHER PUBLICATIONS

Industrial Lighting Fixtures for Hazardous Locations and Adverse Environments Reorder Catalog H–7036 Jan. 28, 1991 (Hazlux–American Electric).

*Primary Examiner*—Richard A. Bertsch
*Assistant Examiner*—M. Kocharov
*Attorney, Agent, or Firm*—Robert M. Rodrick

[57] ABSTRACT

A lighting fixture for use in hazardous locations and adverse environments, includes a mounting plate and a first ballast housing. A second non-interchangeable ballast housing may be alternately employed by use of an adapter ring removably securable intermediate the mounting plate and the second ballast housing. The adapter ring comprises a top portion specially adapted to engage the mounting plate, with first fastening means associated therewith, and a bottom portion specially adapted to engage the second ballast housing, with second fastening means being associated therewith. The adapter ring allows the replacement of the first ballast housing with the second, wherein the first and second ballast housings are not identical and are produced by different manufacturers. The adaptor ring effectively seals the interfaces with the mounting plate and second ballast housing, thereby maintaining the integrity of the lighting fixture for its intended purpose.

13 Claims, 3 Drawing Sheets

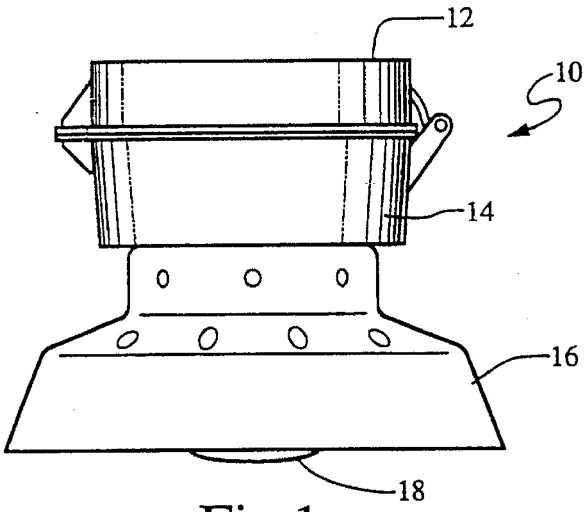
(PRIOR ART) Fig.1
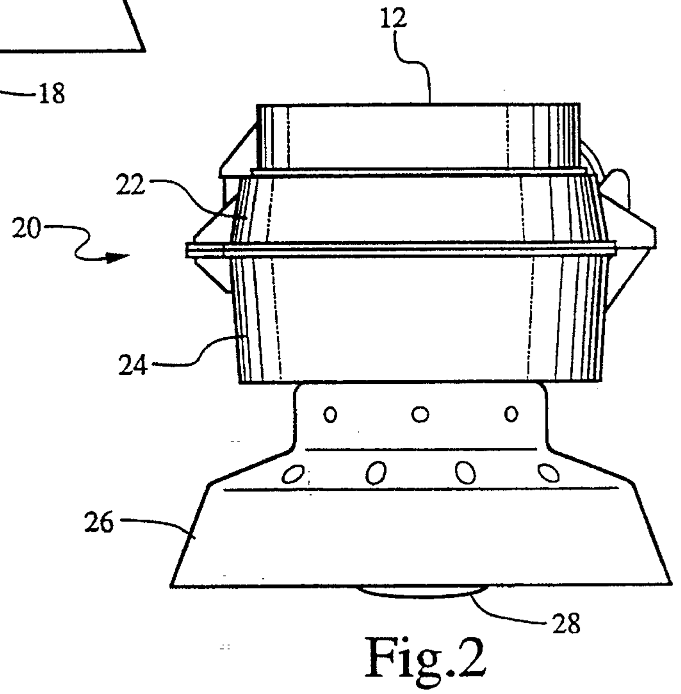
Fig.2
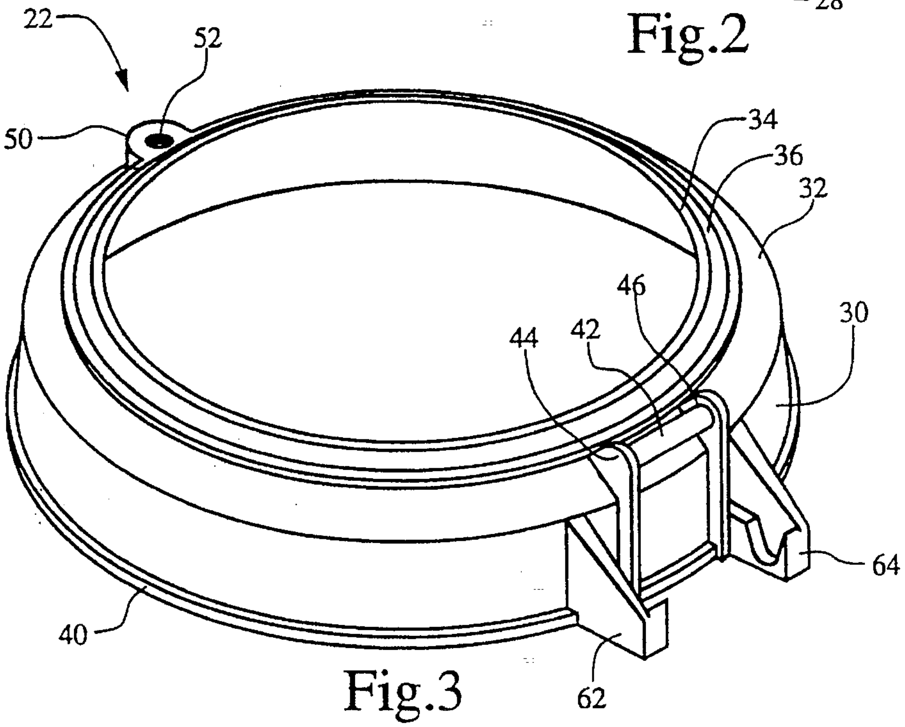
Fig.3

LIGHT FIXTURE FOR USE IN HAZARDOUS ENVIRONMENTS HAVING ADAPTER RING FOR ALTERNATIVE BALLAST HOUSING

FIELD OF THE INVENTION

The present invention relates to lighting fixtures for use in hazardous environments and, more particularly, to such a fixture having an adapter ring specially configured to allow replacement of the ballast housing with a non-identical component.

BACKGROUND OF THE INVENTION

It is well known in the lighting industry that a number of commercial environments require the use of specially adapted lighting fixtures to obtain satisfactory performance and minimize safety risks. For example, it is known that certain lighting fixtures must be specially constructed in order to withstand repeated or constant exposure to water or other liquids, extreme hot or cold temperatures, flammable or explosive gases, etc. Fixtures specially adapted for such usage are commercially available under the Hazlux® trademark offered by assignee of the present invention, as shown in reorder catalog No. H-7036 entitled "Industrial Lighting Fixtures for Hazardous Locations and Adverse Environments" effective Jan. 28, 1991.

Typically, light fixtures for use in hazardous locations and adverse environments are of the fluorescent or high intensity discharge variety, and therefore require ballasts for proper operation. Since the performance of a typical ballast tends to deteriorate with age, replacement of ballasts is a common requirement. Usually, the entire ballast housing is removed and replaced with an identical component.

To date, there is virtually no standardization of ballast housing configurations in the industry. While ballast housings provided by different manufacturers may look generally the same and operate in generally the same manner, one manufacturer's product will not likely serve as an interchangeable replacement for another manufacturer's housing. If the user wishes to replace a malfunctioning housing with a product made by another manufacturer, it is also necessary to replace the mounting plate and rewire the light fixture. This results in a considerable expense. The incompatibility between different manufacturers' ballast housings has presented a considerable problem which has heretofore not been adequately addressed.

SUMMARY OF THE INVENTION

It is an object of the present invention to provide a lighting fixture for use in hazardous locations and adverse environments which is adapted to accept ballast housings provided by a plurality of manufacturers. More particularly, it is an object of this invention to provide a unique adapter ring which enables the mounting plate provided by a first manufacturer to accept a ballast housing provided by a second manufacturer.

It is a further object of this invention to provide an adapter ring for hazardous location lighting fixtures which is easily securable to the mounting plate of one manufacturer and the ballast housing of another manufacturer, and to provide an effective seal between all such components to maintain the performance standards of the original fixture.

It is a still further object of this invention to provide an adapter ring which enables the use of a plurality of different sized ballast housings with a single mounting plate, without requiring replacement of supply wiring or conduit connections.

It is also an object of this invention to provide an adapter ring which can be quickly and easily installed between a mounting plate and an otherwise incompatible ballast housing to minimize the time and effort required for replacement of the ballast housing.

In accordance with the teachings of the present invention, there is disclosed herein a hazardous environment lighting fixture having a unique adapter ring for attachment intermediate the mounting plate and ballast housing. The adapter ring of this invention includes contiguous top and bottom portions, with the top portion being adapted to removably engage a conventional mounting plate, and the bottom portion being adapted to removably engage a ballast housing which is not securable directly to the mounting plate. The top portion of the adapter ring is configured to form a suitable seal with the lower edge of the mounting plate, while the bottom portion of the adapter ring is configured to form a suitable seal with the top edge of the ballast housing.

BRIEF DESCRIPTION OF THE DRAWINGS

FIG. 1 is a side elevational view of a conventional lighting fixture for use in hazardous environments;

FIG. 2 is a side elevational view of a lighting fixture similar to that shown in FIG. 1, but including the adapter ring of the present invention and a different ballast housing than the fixture shown in FIG. 1;

FIG. 3 is an enlarged top perspective view of the adapter ring of the present invention;

DETAILED DESCRIPTION OF THE PREFERRED EMBODIMENT

Figure 4:
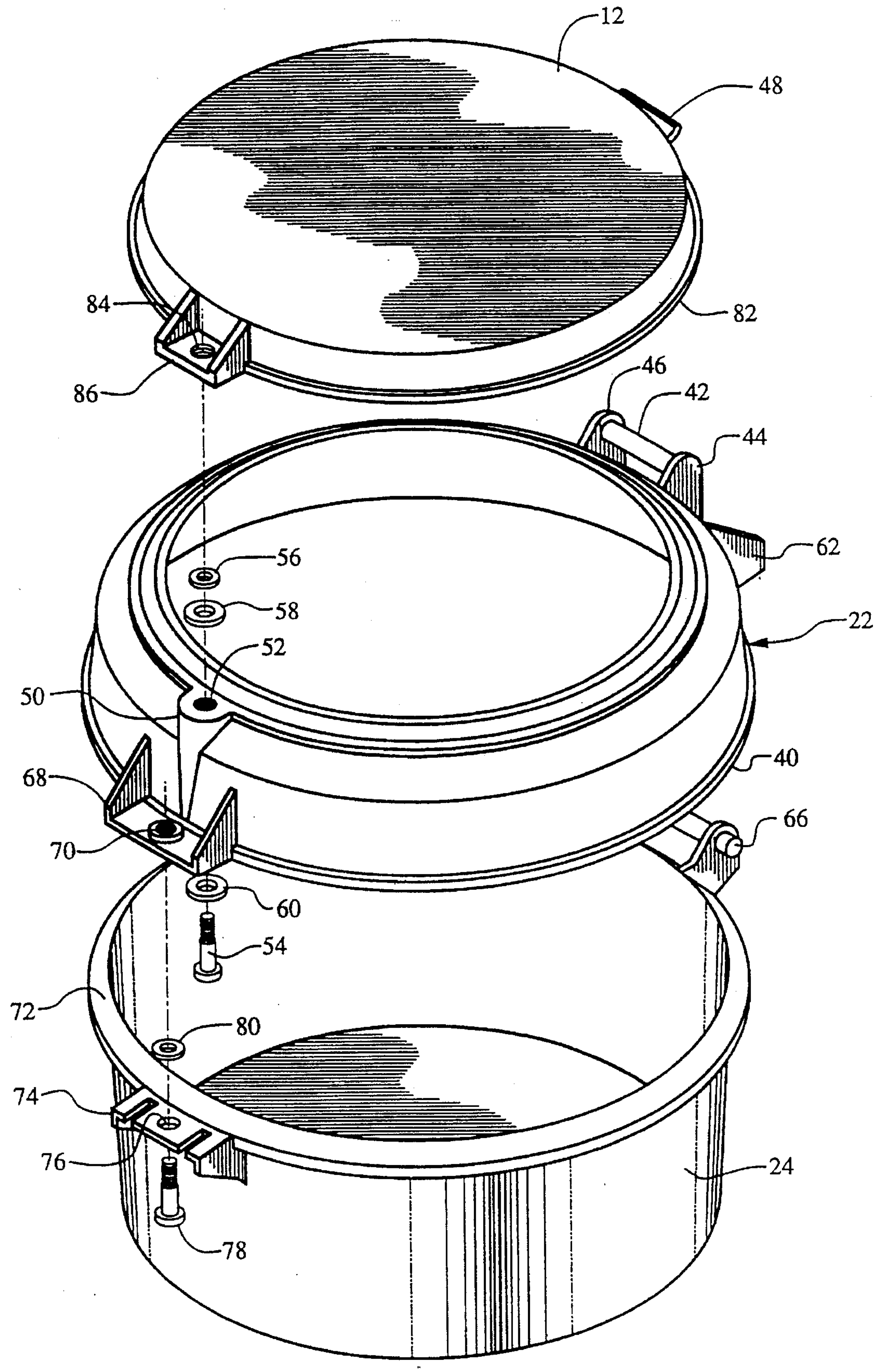
FIG. 4 is a top perspective exploded view of a portion of a lighting fixture in accordance with the present invention, showing the mounting plate, adapter ring, and ballast housing.

Referring initially to FIG. 1, a generally conventional lighting fixture 10 is shown, comprising mounting plate 12, ballast housing 14, and reflector 16. Fixture 10 represents a typical embodiment of a lighting fixture designed specifically for use in hazardous locations and/or adverse environments. For the sake of simplicity, such lighting fixtures may be referred to herein generally as "hazardous location lighting fixtures." As will be fully appreciated by those skilled in the art, reflector 16 comprises a housing for a suitable bulb enclosed within globe 18. The actual bulb element is purely conventional and not shown or discussed herein for the sake of brevity, although the details of its structure and operation will be well known to those in the industry.

Referring now to FIG. 2, hazardous location lighting fixture 20 is shown embodying the principles of the present invention. Fixture 20 comprises the same mounting plate 12 as used with fixture 10. However, fixture 20 includes a ballast housing 24, which while functionally equivalent ballast housing 14, is of a different configuration so that direct replaceability is not permitted. Fixture 20, however, incorporates a unique adapter ring 22 which enables ballast housing 24 and corresponding reflector 26 and globe 28 to be utilized with mounting plate 12. Mounting plate 12 and ballast housing 24 are normally incompatible with one another, as is common with components from different manufacturers. Adapter ring 22, as discussed in more detail below, enables ballast housing 24 to be suitably secured to mounting plate 12, thereby replacing ballast housing 14 at the end of its useful life without necessitating replacement of mounting plate 12 and consequential replacement of the supply wiring or conduit connections.

Adapter ring 22 is shown in detail in FIGS. 3 through 6. With reference to FIG. 3, adapter ring 22 is shown to comprise a lower, substantially vertical sidewall 30, and an inwardly and upwardly sloping upper surface 32. Projecting upwardly from surface 32 is rim 34 with concentric annular groove 36 formed thereabout. As shown more clearly in FIGS. 7 and 8, groove 36 includes O-ring 38 disposed therein which serves as a sealing member between the interface of adapter ring 22 and mounting plate 12. As those skilled in the art will fully appreciate, rim 34, groove 36 and O-ring 38 cooperate to effectively seal the interface of mounting plate 12 and adapter ring 22, while the lower edge 40 of sidewall 30 is configured to similarly seal the interface between adapter ring 22 and ballast housing 24. Effective sealing at the aforementioned interfaces is essential to the successful operation of fixture 20 for its intended purpose as a hazardous location fixture.

Figure 5:
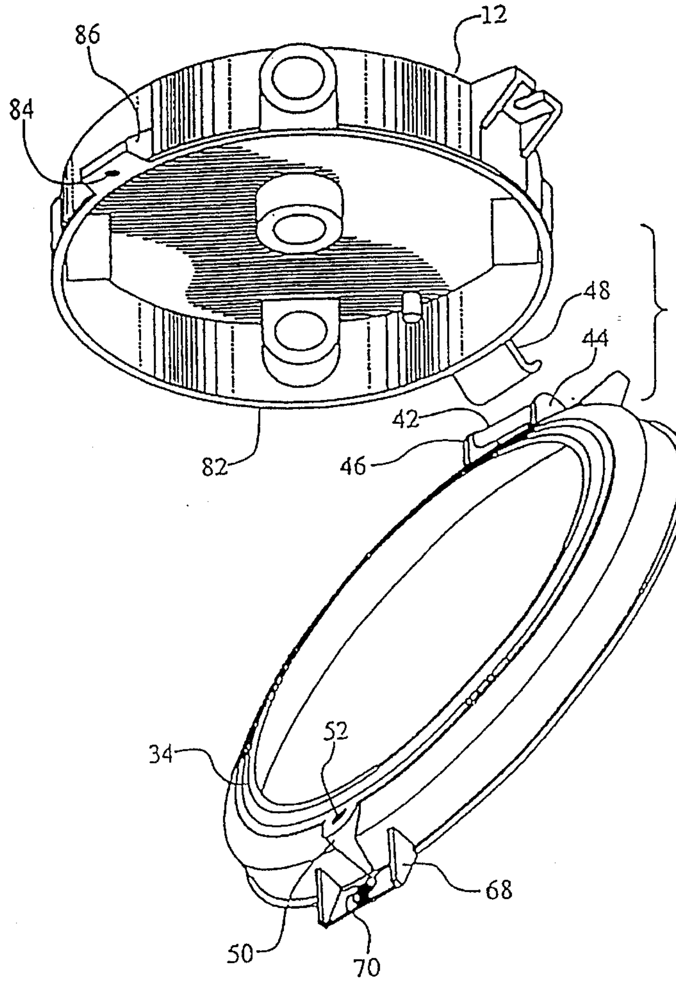
FIG. 5 is a bottom exploded view indicating the preferred assembly technique for attaching the adapter ring to the mounting plate.

As illustrated primarily in FIGS. 4 and 5, adapter ring 22 is removably securable to mounting plate 12. Adapter ring 22 includes a hinge bar 42 suspended between ears 44 and 46 projecting from upper surface 32. Hinge bar 42 is configured to engage hinge hook 48 extending radially outwardly from mounting plate 12. Diametrically opposed to hinge bar 42 is boss 50 integrally formed within adapter ring 22, with hole 52 being formed therethrough. As shown in FIG. 4, screw 54 preferably is retained within hole 52 by means of washer 56 which, for example, may be composed of nylon. Sealing washers 58 and 60 are disposed along the length of screw 54 at either end of hole 52 in order to effectively seal fixture 20, as shown in more detail in FIGS. 7 and 8. Washers 58 and 60 are preferably composed of neoprene, but may be formed from any composition suitable for the purpose.

Side wall 30 further includes fastening means for removably securing adapter ring 22 to ballast housing 24. A pair of hinge pin receptacles 62 and 64 (FIG. 3) project radially outwardly from sidewall 30, and are oriented to receive and support conventional hinge pins extending generally tangentially from the outer rim of ballast housing 24. One such hinge pin is shown at 66 (FIG. 4), the other being substantially identical thereto as well known in the art. On the opposite side of adapter ring 22 is bracket 68 having a threaded hole 70 formed therethrough. The upper edge 72 of ballast housing 24 also has a bracket 74 extending therefrom, with hole 76 formed therethrough, hole 76 being alignable with threaded hole 70. Screws 78 may be retained within hole 76 by means of washer 80, and threadingly engaged with hole 70 upon assembly of ballast housing 24 to adapter ring 22.

Figure 6:
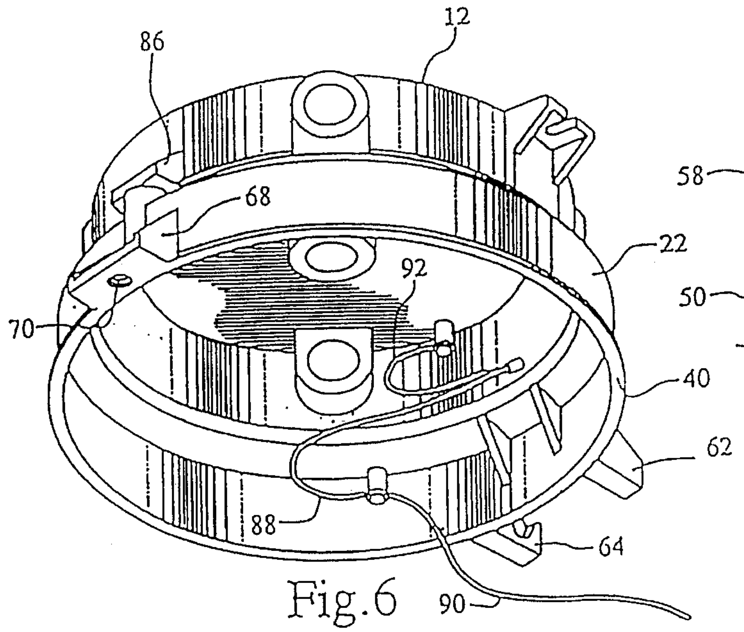
FIG. 6 is a bottom perspective view showing the adapter ring attached to the mounting plate.

As suggested in FIGS. 5 and 6, the preferred assembly of adapter ring 22 to mounting plate 23 entails engaging hinge bar 42 and hinge hook 48, then swinging adapter ring 22 upward to insure complete contact between lower edge 82 of mounting plate 12 with gasket 38. Screw 54 is then threadingly engaged with hole 84 formed in bracket 86, thereby securing adapter ring 22 to mounting plate 12. In a similar manner, as suggested in FIG. 4, ballast housing 24 is securable to adapter ring 22 by first engaging hinge pins 66 within receptacles 62 and 64, then swinging ballast housing 24 upward to sealingly engage lower edge 40 of adapter ring 22 with upper edge 72 of ballast housing 24. Screw 78 is then threadingly engaged with hole 70 to secure ballast housing 24 to adapter ring 22.

As shown in FIG. 6, adapter ring 22 preferably includes ground wires 88 and 90 operatively connected thereto. Ground wire 88 may be secured to ground wire 92 extending from mounting plate 12, while ground wire 90 is intended for attachment to ballast housing 24.

Figure 7:
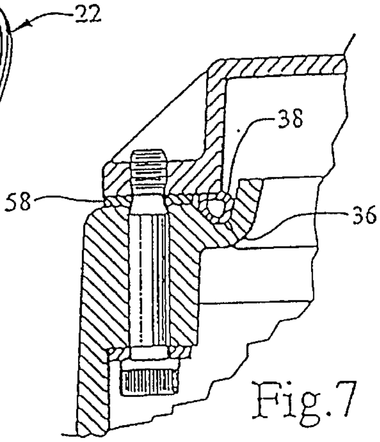
FIG. 7 is an enlarged sectional detail of a portion of the interface between the mounting plate and adapter ring.
Figure 8:
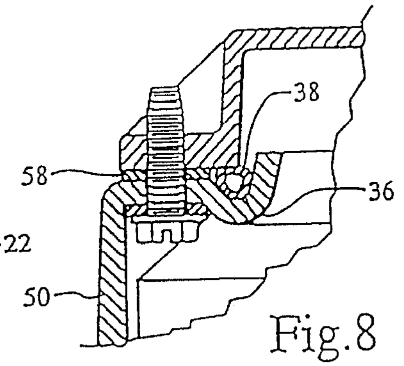
FIG. 8 is an alternative embodiment of the adapter ring structure shown in FIG. 7.

FIGS. 7 and 8 illustrate alternative embodiments for boss 50 to comply with different requirements and specifications. As those skilled in the art will appreciate, the configuration shown in FIG. 7 is designed to comply with UL Class II requirements while the configuration in FIG. 8 complies with the UL Class I requirements. Other variations in adapter ring 22 are also expected to be made to comply with various performance requirements, without departing from the scope of this invention.

As illustrated herein, adapter ring 22 is preferably formed by casting from a suitable metal, such as aluminum. When so formed, all necessary features may be integrated into a single unit, thereby minimizing storage, handling, and assembly concerns. Only the screws, washers, and O-ring needed to fasten and seal adapter ring 22 need be separate components.

As may be appreciated, the particular size and shape of adapter ring 22 is dictated by the size and shape of existing mounting plates 12 and ballast housings 24. Variations in mounting plates and ballast housings may be accommodated by variation in the size and shape of adapter ring 22. The present invention contemplates the design of various configurations of adapter rings for different configurations of mounting plates and ballast housings. Accordingly, it is expressly understood that the following claims are intended to cover and embrace not only the specific embodiments disclosed herein, but also such modifications and applications within the scope of this invention.

What is claimed is:

1. An adapter ring for use with a lighting fixture, said lighting fixture including a mounting plate, said adapter ring comprising:

a top portion adapted to engage said mounting plate, having first fastening means associated therewith for removably securing said adapter ring to said mounting plate;

a bottom portion adapted to engage a ballast housing, said bottom portion including means for sealingly engaging a top edge portion of said ballast housing and having second fastening means associated therewith for removably securing said adapter ring to said ballast housing;

said adapter ring being securable intermediate said mounting plate and said ballast housing.

2. An adapter ring as set forth in claim 1, wherein: said bottom portion comprises a substantially vertical wall having a lower edge; and said top portion comprises an inwardly and upwardly sloped surface contiguous with said vertical wall, the upper edge thereof forming an upstanding annular rim.

3. An adapter ring as set forth in claim 2, further comprising:

an annular groove formed in said inwardly sloped surface circumscribing said annular rim, said groove being adapted to receive said lower edge portion of said mounting plate; and means disposed within said groove for sealing the interface between said adapter ring and said mounting plate.

4. An adapter ring as set forth in claim 1, wherein said mounting plate includes a hinge hook extending generally outwardly from a side portion thereof and a threaded hole formed in an opposite side portion thereof, and said first fastening means comprises:

a hinge bar integrally formed with said upper portion of said adapter ring, adapted to engage said hinge hook;

a boss integrally formed with said upper portion opposite said hinge bar alignable with said threaded hole, having a clearance hole formed therethrough; and a screw, insertable through said clearance hole in said boss and engageable with said threaded hole.

5. An adapter ring as set forth in claim 1, wherein said ballast housing includes a pair of hinge pins extending generally tangentially from a side portion thereof and a boss formed in an opposite side thereof having a clearance hole formed therethrough, and said second fastening means comprises:

hinge receptacles integrally formed with said lower portion of said adapter ring, adapted to receive and support said hinge pins;

a threaded hole formed in said lower portion opposite said hinge receptacles alignable with said clearance hole; and a screw, insertable through said clearance hole in said boss and engageable with said threaded hole.

6. An adapter ring for a lighting fixture specially adapted for use in hazardous locations, said lighting fixture including a mounting plate, a ballast housing, and bulb means, said mounting plate having a lower edge portion, said adapter ring comprising;

a top portion adapted to engage said mounting plate, having first fastening means associated therewith for removably securing said adapter ring to said mounting plate, said top portion comprising a frustoconical section having an upper edge adapted to sealingly engage said lower edge portion of said mounting plate; and, a bottom portion adapted to engage a ballast housing, having second fastening means associated therewith for removably securing said adapter ring to said ballast housing, said bottom portion comprising a generally vertical section contiguous with said frustoconical section having a lower edge adapted to sealingly engage an upper edge portion of said ballast housing;

said adapter ring being securable intermediate said mounting plate and said ballast housing.

7. An adapter ring as set forth in claim 6, wherein:

said upper edge of said frustoconical section includes an annular groove formed therein, with sealing means being disposed in said groove for effecting said sealing engagement between said upper edge and said lower edge portion of said mounting plate.

8. An adapter ring as set forth in claim 6, wherein said mounting plate includes a hinge hook extending generally outwardly from a side portion thereof and a threaded hole formed in an opposite side portion thereof, and said first fastening means comprises:

a hinge bar integrally formed with said upper portion of said adapter ring, adapted to engage said hinge hook;

a boss integrally formed with said upper portion opposite said hinge bar alignable with said threaded hole, having a clearance hole formed therethrough; and a screw, insertable through said clearance hole in said boss and engageable with said threaded hole.

9. An adapter ring as set forth in claim 6, wherein said second ballast housing includes a pair of hinge pins extending generally tangentially from a side portion thereof and a boss formed in an opposite side thereof having a clearance hole formed therethrough, and said second fastening means comprises:

hinge receptacles integrally formed with said lower portion of said adapter ring, adapted to receive and support said hinge pins;

a threaded hole formed in said lower portion opposite said hinge receptacles alignable with said clearance hole; and a screw, insertable through said clearance hole in said boss and engageable with said threaded hole.

10. A lighting fixture assembly for use in hazardous locations, comprising:

a mounting plate, securable to a structure suitable for suspending said lighting fixture, having a lower edge;

a ballast housing having an upper edge;

an adapter ring for use with said ballast housing, having an upper edge sealingly engaged with said lower edge of said mounting plate, and having a lower edge sealingly engaged with said upper edge of said ballast housing, said adapter ring including first fastening means for removably securing said adapter ring to said mounting plate, and second fastening means for removably securing said adapter ring to said ballast housing, said first fastening means comprising a first hinge member for hingedly securing said adapter ring to said mounting plate, said adapter ring being selectively moveable between open and closed positions, and a first screw for retaining said adapter ring in said closed position; and bulb means associated with said ballast housing.

11. A lighting fixture assembly as set forth in claim 10, wherein:

said second fastening means comprises a second hinge member for hingedly securing said adapter ring to said ballast housing, said ballast housing being selectively moveable between open and closed positions, and a second screw for retaining said ballast housing in said closed position.

12. A lighting fixture for use in hazardous locations, comprising:

a mounting plate, securable to a structure suitable for suspending said lighting fixture;

an adapter ring, hingedly secured to said mounting plate and selectively moveable between open and closed positions;

ballast housing means, hingedly secured to said adapter ring and selectively moveable between open and closed positions; and bulb means, operatively connected to said ballast housing means.

13. A lighting fixture as set forth in claim 12, wherein;

said mounting plate is constructed to accommodate an upper edge of a ballast housing of a given configuration and said adapter ring is constructed to accommodate an upper edge of a ballast housing of a different configuration.

* * * * *